United States Patent
Gale et al.

(10) Patent No.: US 9,322,480 B2
(45) Date of Patent: Apr. 26, 2016

(54) TURBOCHARGER ARRANGEMENT AND SET OF FEEDBACKS FOR ELECTRIC ACTUATOR CONTROL

(71) Applicant: Ford Global Technologies, LLC, Dearborn, MI (US)

(72) Inventors: Allan Roy Gale, Livonia, MI (US); Vladimir V. Kokotovic, Bloomfield Hills, MI (US); James Alfred Hilditch, Canton, MI (US); Gregory Patrick McConville, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 784 days.

(21) Appl. No.: 13/674,844

(22) Filed: Nov. 12, 2012

(65) Prior Publication Data

US 2014/0130506 A1    May 15, 2014

(51) Int. Cl.

| | |
|---|---|
| *F02D 23/02* | (2006.01) |
| *F16K 3/00* | (2006.01) |
| *F02C 6/12* | (2006.01) |
| *F02D 41/00* | (2006.01) |
| *F02D 41/20* | (2006.01) |
| *F02B 37/16* | (2006.01) |
| *F02B 37/18* | (2006.01) |
| *F02D 41/22* | (2006.01) |

(52) U.S. Cl.
CPC ... *F16K 3/00* (2013.01); *F02C 6/12* (2013.01); *F02D 41/0007* (2013.01); *F02D 41/20* (2013.01); *F02B 37/16* (2013.01); *F02B 37/18* (2013.01); *F02D 41/221* (2013.01); *F02D 2041/2065* (2013.01); *F02D 2200/0406* (2013.01); *Y02T 50/671* (2013.01)

(58) Field of Classification Search
CPC ......... F16K 3/00; F02C 6/12; F02D 41/0007; F02D 41/20; F02D 41/221; F02D 2041/2065; F02D 2200/0406; F02B 37/16; F02B 37/18; Y02T 50/671
USPC ..................................................... 60/602, 611
See application file for complete search history.

(56) References Cited

U.S. PATENT DOCUMENTS

| | | | |
|---|---|---|---|
| 5,771,884 A * | 6/1998 | Yarnall | A61M 16/20 128/204.19 |
| 2011/0076166 A1 | 3/2011 | Godeke et al. | |
| 2012/0001104 A1 | 1/2012 | Shimada et al. | |
| 2012/0001111 A1 | 1/2012 | Takeda et al. | |

* cited by examiner

*Primary Examiner* — Jorge Leon, Jr.
(74) *Attorney, Agent, or Firm* — Julia Voutyras; Alleman Hall McCoy Russell & Tuttle LLP

(57) ABSTRACT

Various methods for controlling a wastegate with an actuator having a temperature-dependent magnetic field are provided. In one example, the magnetic field is estimated based on operating conditions and other parameters, and used to apply a magnetic correction to a voltage supplied to the actuator. The methods may provide accurate wastegate control in the presence of varying magnetic fields, ensuring the proper supply of boost to an engine.

13 Claims, 5 Drawing Sheets

TURBOCHARGER ARRANGEMENT AND SET OF FEEDBACKS FOR ELECTRIC ACTUATOR CONTROL

FIELD

The disclosure relates to a method for controlling a turbocharger arrangement of an internal combustion engine and an electric actuator.

BACKGROUND AND SUMMARY

Engines may use a turbocharger to improve engine torque/power output density. In one example, a turbocharger may include a compressor and a turbine connected by a drive shaft, where the turbine is coupled to an exhaust manifold side and the compressor is coupled to an intake manifold side. In this way, the exhaust-driven turbine supplies energy to the compressor to increase the pressure in the intake manifold (e.g. boost, or boost pressure) and to increase the flow of air into the engine. The boost may be controlled by adjusting the amount of gas reaching the turbine, for example with a wastegate. The wastegate valve may be controlled based on operating conditions to achieve the desired boost. In one example, the wastegate valve may be an electronic wastegate controlled by an associated electric actuator. In some embodiments, the electric actuator is an electric motor. The electric motor is driven to alter the wastegate position, thereby controlling the amount of gas reaching the turbine and achieving the desired boost.

U.S. Pat. App. No. 2012/0001111 describes a set of feedbacks for position control of an exhaust gas valve with an electric actuator. The electric actuator includes an electric motor which transmits a driving force to a rod. The linear motion of the rod is subsequently transferred via rotational motion to a wastegate, thereby controlling the wastegate and thus the boost provided to the engine. An engine control unit senses the linear position of the rod via a stroke sensor which includes a magnetic sensing Hall element configured to sense changes in the magnetic flux in a magnetic movable body included in the electric actuator. Because there is a known correspondence among motion of the rod, motion of the magnetic movable body, and motion of the exhaust valve, the position of the exhaust valve can be monitored and controlled by sensing changes in the movable body magnetic flux. In addition, the stroke sensor could sense the rotational position of a lever in the actuator which rotates to move the rod in a linear fashion.

The inventors herein have recognized a problem with such approaches utilizing an electric actuator to control the wastegate valve. Even if accurate sensing is provided by controlling the magnetic flux, the torque provided by the electric actuator may vary based on changes to the magnetic field generated in the actuator caused by variation in operation temperatures (possibly exceeding 100 degrees Celsius). Without the ability to account for variation in such a magnetic field as it changes throughout the range of operating temperatures, as well as its affects on actuator torque and position, control of the wastegate may degrade, causing undesirable changes in boost and engine output.

Methods for compensating for the magnetic field of an electric actuator operatively coupled to a wastegate across a range of temperatures are provided.

In one example, a wastegate actuator coupled to a wastegate valve in an engine exhaust is adjusted to control an engine boost level of an engine. The adjustment is made based on a magnetic field of a magnet in the wastegate actuator and corrected based on magnet temperature.

In this way, by adjusting the wastegate actuator based on a magnetic field and correcting the adjustment based on magnet temperature, it is possible to account for variation in the magnetic field due to temperature variation and thereby more accurately control actuator torque, velocity, and wastegate position.

In another example, an encoder may be used to measure a position representative of the actuator and calculate an angular velocity based on the position. A terminal voltage can then be measured, and, together with the angular velocity, used to estimate a magnet temperature and a magnetic field. An actual actuator torque can then be estimated for a given applied current and operating temperature. In another embodiment, an actuator resistance is estimated with an applied current, terminal voltage, and brush voltage. A magnet temperature can then be estimated based on a change in winding resistance per degree. The magnetic field can then be estimated. In this way, the magnetic field produced by an electric actuator can be estimated throughout a range of operating temperatures. Output of the electric actuator may be accurately controlled, in turn controlling the wastegate and supplying the desired level of boost to the engine. The embodiments herein may further apply a magnetic correction to the voltage or signal used to control the electric actuator. At a first temperature, in which the magnitude of the magnetic field may be reduced, the magnetic correction may increase the actuating voltage or signal amplitude for a given desired actuator torque. At a second, lower temperature, in which the magnitude of the magnetic field may be strengthened relative to that at the first temperature, the magnetic correction may decrease the actuating voltage or signal amplitude to provide the given desired actuator torque.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

In boosted engines, electronic wastegate actuators may provide precise output to achieve delivery of a desired boost to the engine. Such actuators, however, contend with high surrounding temperatures and large variations in these temperatures. The output of an electric actuator may be a function of the current supplied to it and the magnetic field generated by its magnets, if present. This magnetic field, including its magnitude, varies as the surrounding temperature changes through a range of operating temperatures, which may exceed 100 degrees Celsius. Without the ability to account for variation in this magnetic field throughout the operating temperature range, control of the wastegate may degrade, causing undesirable changes in performance of the boost engine output. While the force produced by an electric actuator may be a function of its magnetic flux multiplied by the current flowing through its windings (hereinafter referred to as "winding current"), it should be understood that the magnetic flux may be a function of the temperature of its magnets based on the material composition of the magnets. It will be assumed in the present disclosure that the magnetic flux of an electric actuator varies inversely with magnet temperature. However, the methods described herein may be adapted for the case in which magnetic flux varies proportionally to magnet temperature.

Figure 1:
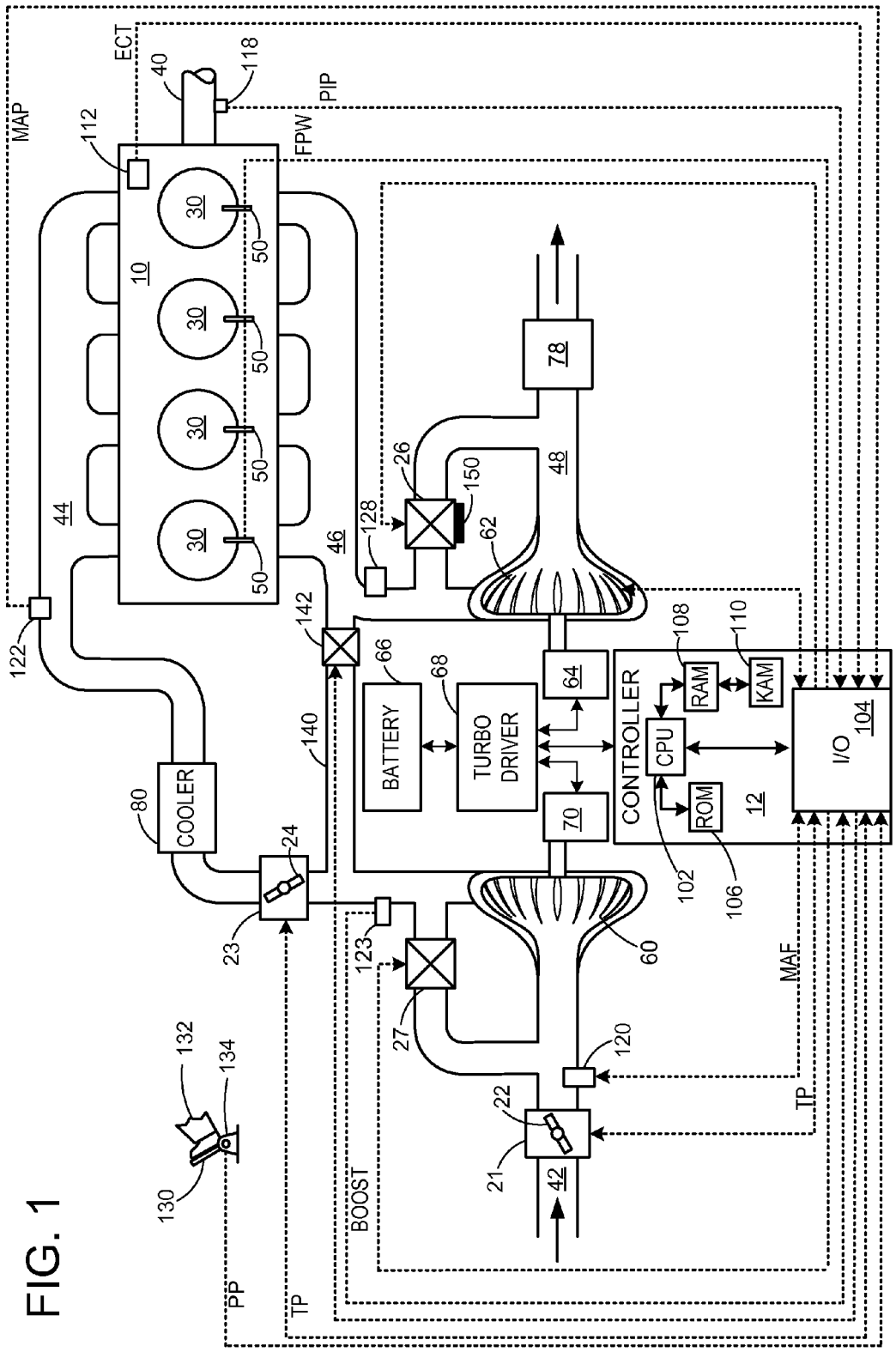
FIG. 1 shows a block diagram of a turbocharged engine including a wastegate.

Various methods are provided for estimating and correcting for a changing magnetic field in an electric actuator. The methods may include estimating the magnetic field based on a plurality of parameters including angular velocity, terminal voltage, actuator current, and magnet temperature. The methods may further include estimating the magnetic field with a lookup table based on parameters including electrical current, brush voltage, and winding resistance. FIG. 1 is a block diagram of a turbocharged engine including a wastegate. The engine of FIG. 1 also includes a controller configured to carry out the methods depicted in FIGS. 2-5.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF (mass airflow) and MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which, for example, may be an electric actuator including permanent magnets. In some embodiments, actuator 150 may be an electric motor. Additional detail regarding wastegate 26 and actuator 150 will be presented below. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Figure 2:
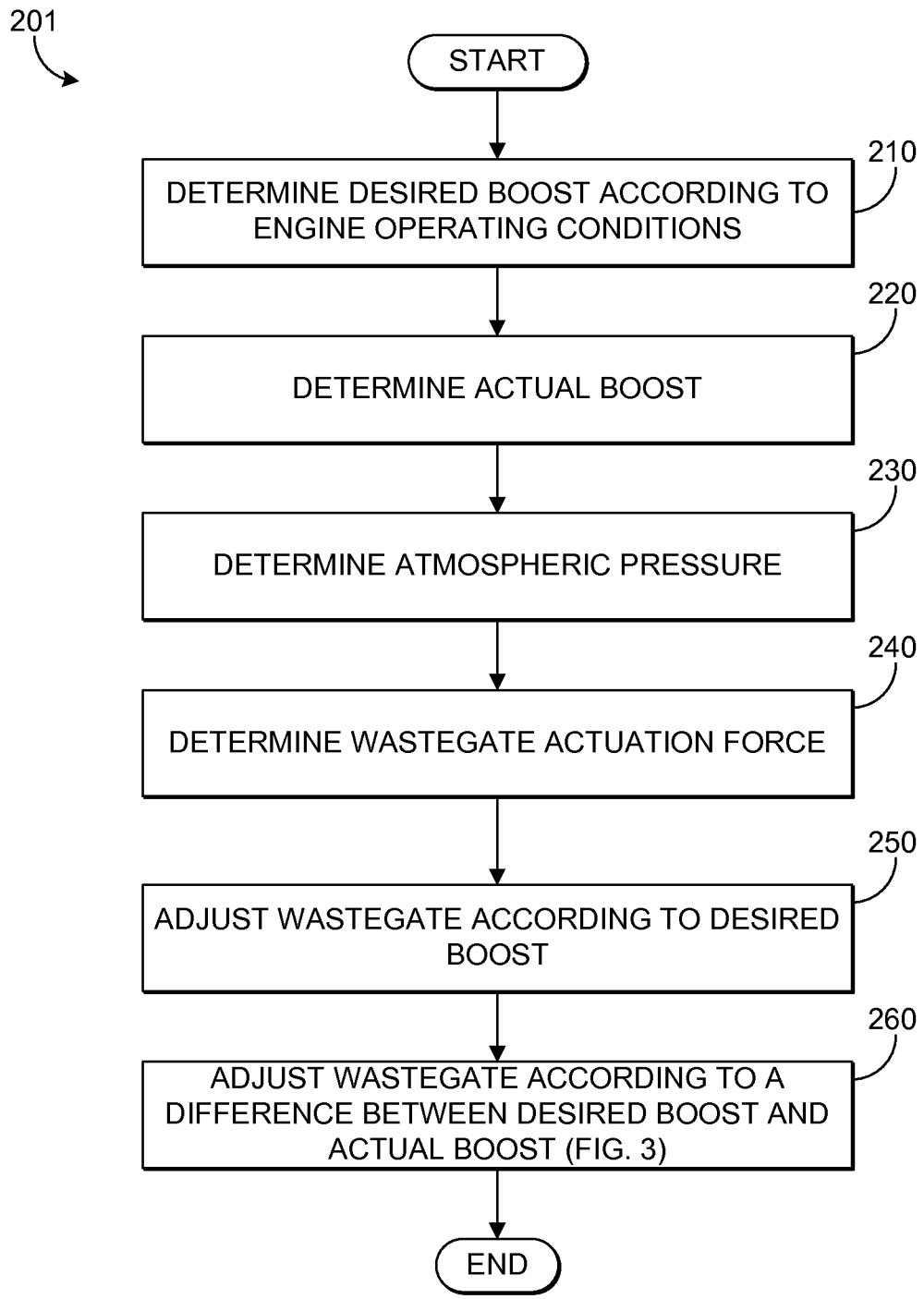
FIG. 2 shows a flow chart illustrating a method for controlling a turbocharger via a wastegate.

Turning now to FIG. 2, a method 201 may be executed by an engine controller (e.g., controller 12) for controlling a turbocharger via a wastegate (e.g., wastegate 26). In one example, a method of controlling a turbocharger of an engine via a wastegate may comprise determining a desired boost pressure and an actual boost pressure. The wastegate may be adjusted according to a difference between the desired boost pressure and the actual boost pressure.

Continuing with FIG. 2, at 210, the method includes determining a desired boost according to engine operating conditions. The conditions assessed may be directly measured with sensors, such as sensors 112, 118, 120, 122, 123, and 134 for example, and/or the conditions may be estimated from other engine operating conditions. The assessed conditions may include engine coolant temperature, engine oil temperature, mass airflow (MAF), manifold pressure (MAP), boost (for example, BOOST pressure from sensor 123), engine speed, idle speed, barometric pressure, a driver-demanded torque (for example, from a pedal position sensor 134), air temperature, vehicle speed, etc.

Next, at 220, an actual boost pressure may be determined. The actual boost may be directly measured from a sensor, such as sensor 123. The measurement may be sent to controller 12 via the BOOST pressure signal and stored in a computer readable storage medium. In an alternative embodiment, the actual boost pressure may be estimated based on other operating parameters, such as based on MAP and RPM, for example.

Next, at 230, atmospheric pressure may be determined. For example, atmospheric pressure may be measured from the MAP sensor at engine start-up, and/or estimated based on operating conditions of the engine, including MAF, MAP, throttle position, etc. The measurement may be sent to controller 12 and stored in a computer readable storage medium. In an alternative embodiment, the atmospheric pressure may be estimated based on other operating parameters.

Next, at 240, a wastegate actuation force may be calculated based on a pressure differential across the wastegate, exhaust flow, and/or the angle of the wastegate valve. The wastegate may be adjusted according to the wastegate actuation force. The wastegate actuation force may accurately resemble a pressure differential across the wastegate. For example, the wastegate actuation force may be used as an input to wastegate dynamics. The wastegate dynamics may map a desired wastegate pressure or a desired wastegate valve position to a wastegate duty cycle for a given wastegate actuation force, where the duty cycle signal is generated by the controller and sent to the wastegate actuator to adjust the actuation force. Mapping to a wastegate duty cycle may include using lookup tables or calculating the wastegate duty cycle. A wastegate control (WGC) signal may include pulse width modulation via the wastegate duty cycle to adjust the wastegate. The desired wastegate pressure or the desired wastegate valve position may be achieved by feed-forward, feedback, or other control algorithms, for example.

A compensation term may account for delays of the wastegate actuator. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

Next, at 250, the wastegate may be adjusted according to the desired boost. For example, the desired boost pressure may be used as an input to a feed-forward control algorithm for adjusting the wastegate position. The feed-forward control algorithm may process a target wastegate pressure or a target wastegate valve position that may be used as an input to inner control loops.

Next, at 260, a boost error may be calculated as a difference between the desired boost pressure and the actual boost pressure. The wastegate may be adjusted according to the processed boost pressure error. For example, the boost pressure error may be used as an input to a feedback control algorithm to calculate a target wastegate pressure, if pressure control is desired, or a target wastegate valve position within an inner loop. The control algorithm may include a compensation term as described above.

Figure 3:
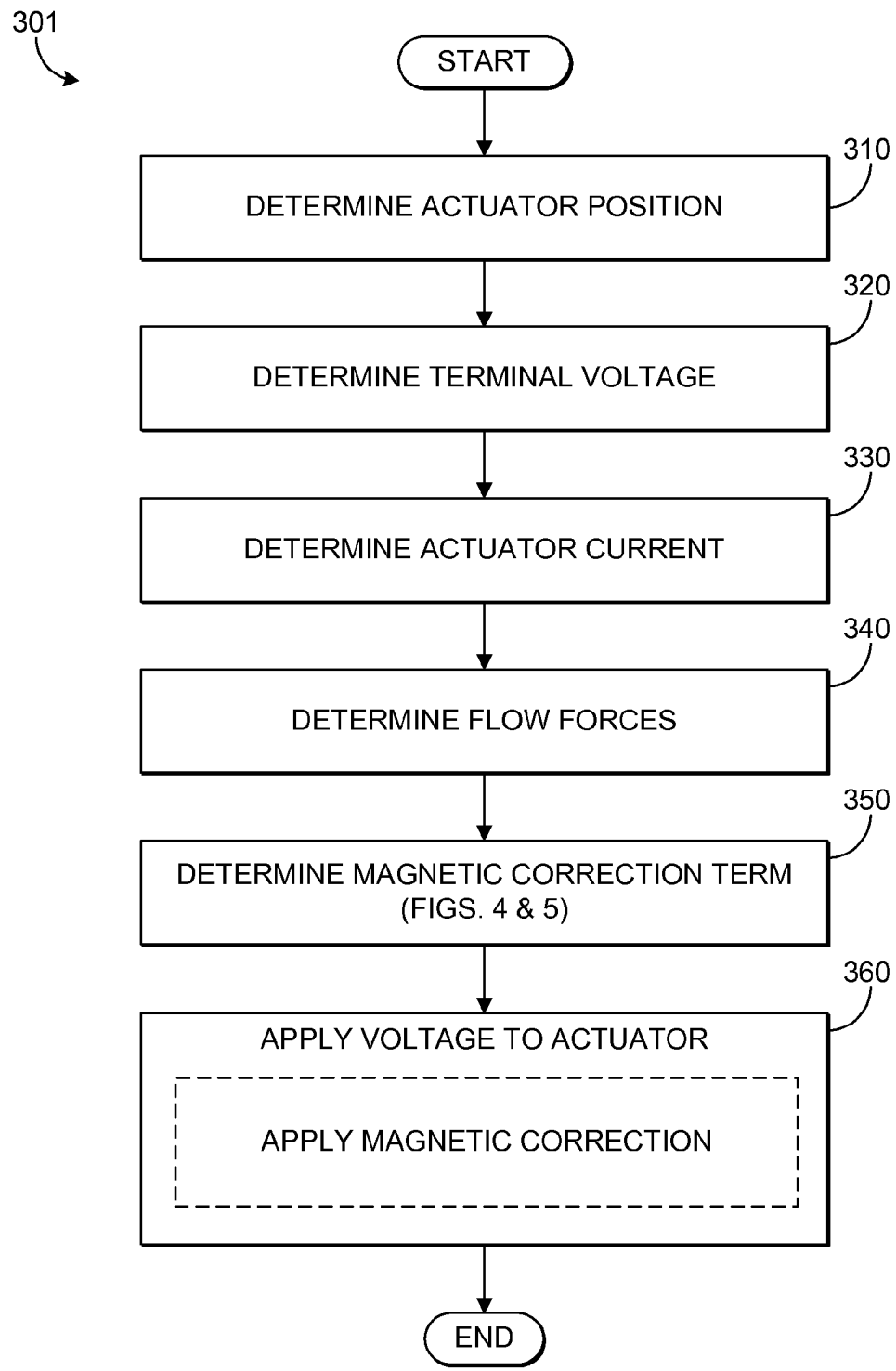
FIG. 3 shows a flow chart illustrating a method for controlling a wastegate via an electric actuator.

As described above, a wastegate (e.g., wastegate 26 in FIG. 1) may be operated by an actuator (e.g., actuator 150). The wastegate may be adjusted to maintain a desired boost level in an intake of the engine. In some embodiments, the actuator may be an electric motor. FIG. 3 is shown providing additional details of the actions carried out in 260, as it applies to an electric motor used to actuate a wastegate. Method 301 may be carried out by an engine controller (e.g., controller 12), for example. Method 301 specifically carries out actuation of a wastegate and may additionally account for variance of a magnetic field produced by the electric motor, the magnetic field varying as a function of the changing surrounding temperature.

At 310 of method 301, a position of the motor is determined. A measurement is first made which depends on the particular type of motor used. In one example, a sensor is made available and used to measure linear displacement of a rod actuated by the motor. Alternatively, the motor may include a rotary encoder housed internally in the motor. The encoder may be coupled to the slowest rotating element in the motor which is coupled to an actuating rod. Such an encoder may collect measurements across the entire range through which the element rotates, which may be for example 180 degrees. In this case, the output of the encoder varies as the motor rotates. In another example, the motor includes a screw (e.g., a ball screw), whose rotation may be measured and used to determine the position of the wastegate valve. However, a different positional encoder may be used, as the ball screw or other rotating element may rotate through a range greater than 180 and/or 360 degrees. Various suitable encoders may be used which, for example, detect changes in angular position as opposed to absolute position.

Next, at 320, the voltage drop across the motor's terminals is measured or otherwise determined. In one example, sense wires are used to feed a signal to an analog-to-digital converter to determine the terminal voltage, which is fed to an engine controller (e.g., controller 12 in FIG. 1). Alternatively, the terminal voltage may be estimated based on the current drawn by the motor if this quantity is known or can be measured, or by finding the difference between the voltage applied to the actuator and the back EMF generated by the actuator. Voltage estimates may further take into account losses due to conductive wires and other conductive components.

Next, at 330, the electrical current drawn by the motor is determined. This may be determined, for example, with the inclusion of a current probe or sensor. Alternatively, the current may be calculated based on Ohm's law as the ratio of actuator voltage (e.g., terminal voltage) and actuator resistance, if these two quantities are known or can be measured and when a resistance/temperature lookup table is available.

Next, at 340, flow forces acting on the wastegate (e.g., wastegate 26 in FIG. 1) are determined. In one example, the flow forces are determined based on a model. Alternatively, a pressure differential across the wastegate is calculated and used to determine the flow forces. In another example, a lookup table is generated with inputs including wastegate position to determine the flow forces. Such methods may employ the use of one or more sensors or sensor signals disposed in engine 200, including mass air flow sensor 120, manifold air pressure sensor 122, throttle position signal TP, BOOST from sensor 123, and a turbocharger rotational speed signal, and may optionally employ the use of one or more load sensors.

Next, at 350, a magnetic correction term is determined. Exemplary methods used to determine the magnetic field are described in further detail below, particularly with reference to FIGS. 4 and 5. In this way, the motor can be accurately actuated and supply of appropriate boost pressure ensured by taking into account variance of the magnetic field produced by magnets included in the motor as temperature varies across the operating range.

As surrounding temperatures increase, or at a relatively high first temperature, the magnetic field may be inhibited and its magnitude reduced. Accordingly, the torque achieved by the motor for a given current also decreases. Such loss of torque may be compensated by increasing the voltage, signal amplitude, and/or duty cycle employed to actuate the motor, as a greater amount of torque is required to sufficiently actuate a wastegate valve. Conversely, as surrounding temperatures decrease, or at a second temperature lower than the first temperature, the magnitude of the magnetic field may be greater. The torque achieved by the motor for a given current may thus increase. Accordingly, the voltage, signal amplitude, and/or duty cycle employed to actuate the motor may be reduced, as a lower amount of torque is required to sufficiently actuate the wastegate valve. Various methods may employ the use of one or more threshold(s) such that when the surrounding temperature is above a threshold, the voltage or signal amplitude is increased, and conversely reduced with the temperature is below the threshold. In some embodiments, the surrounding temperature is approximated by determining the temperature of the motor's magnets. As described above, the magnetic flux generated by the motor's magnets may be a function of the temperature of its magnets and may be proportional or inversely proportional depending on their material composition. It is assumed that the magnetic flux of an electric actuator varies inversely with temperature. However, the methods described herein may be easily adapted for the case in which magnetic flux varies proportionally to temperature.

In one example, the magnetic field is determined based on the known equation F=BiL, for the case in which current is perpendicular to the magnetic field. First, the current i supplied to the motor may be determined by various suitable methods including those described above. The force F exerted by the motor may also be measured or determined using various suitable methods. The length L of current-carrying wire may be calculated ahead of time based on known attributes of the motor. With these quantities the magnetic field B produced by the motor may be calculated and leveraged to determine a magnetic field correction when actuating a wastegate. Certain quantities, such as motor force, may not be available or easily determined. In such a case, other methods may be appropriate to determine the motor magnetic field including those described below with reference to FIGS. 4 and 5.

Finally, at 360, a voltage is applied to the motor incorporating the magnetic correction term, thereby actuating the wastegate valve and supplying an appropriate boost to the engine. A pulse-width modulated signal may be used to actuate the wastegate valve, for example. For example, the duty cycle would be increased as the temperature increases, in one example.

In this way, a wastegate may be accurately controlled, ensuring that the desired boost is provided to the engine while remaining responsive to operating conditions and driver demands. Further, by adjusting a wastegate actuator based on a magnetic field and correcting the adjustment based on magnet temperature, it is possible to account for variation in the magnetic field due to temperature variation and thereby more accurately control actuator torque and thus wastegate position.

Figure 4:
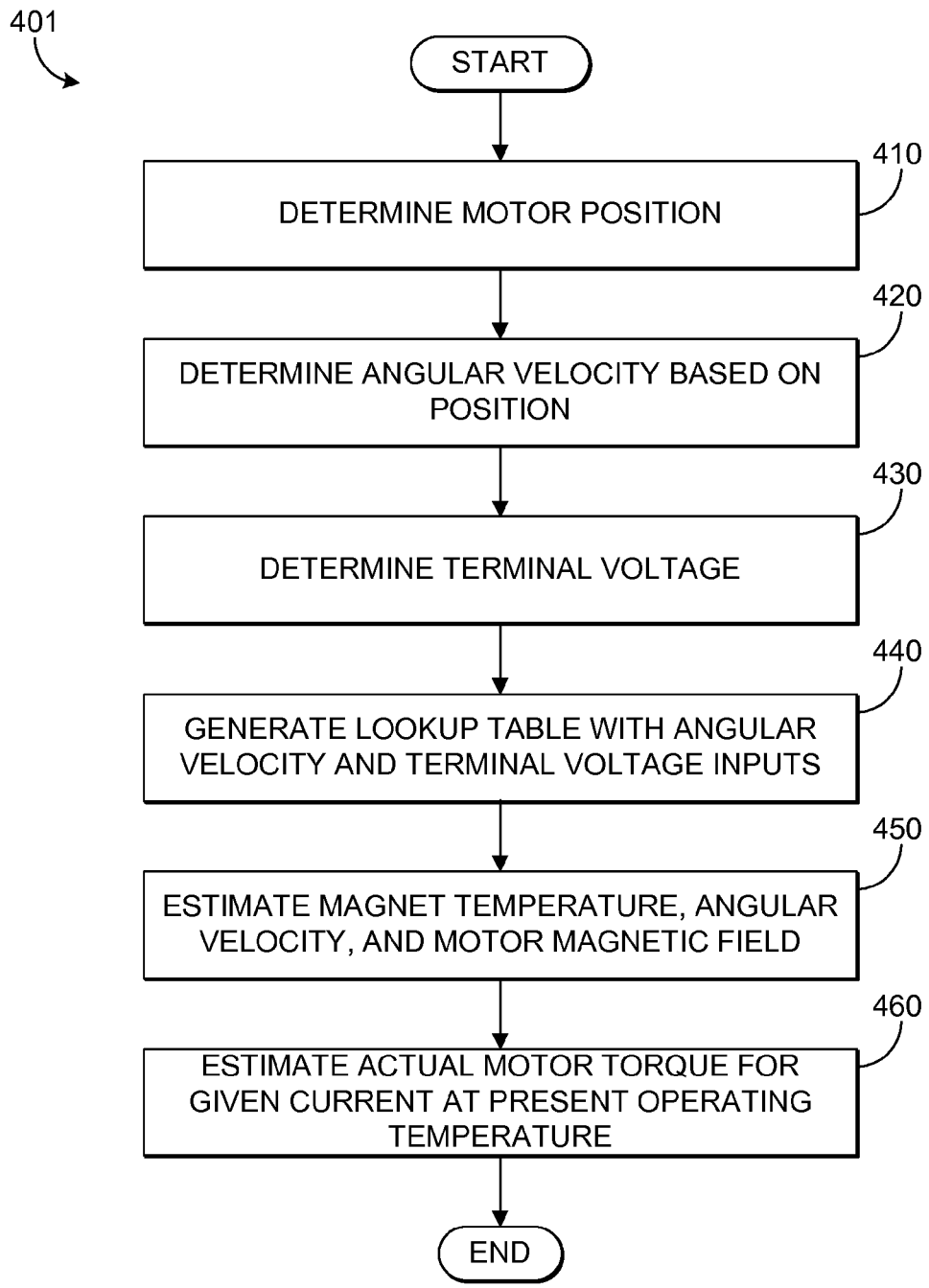
FIG. 4 shows a flow chart illustrating a method for estimating and correcting for a varying magnetic field produced by an electric actuator.

Turning now to FIG. 4, an exemplary method 401 is shown providing additional details of the actions carried out in 350. Specifically, method 401 indirectly determines the magnetic field produced by the motor's magnets.

Method 401 begins at 410 where the position of the motor is determined. As described above, the motor may include a positional encoder from which the motor position may be derived, though another suitable method for determining the motor position may be employed without departing from the scope of the present disclosure.

Next, at 420, the angular velocity of the motor is determined. Various suitable methods may be employed for determining the angular velocity without departing from the scope of the present disclosure. In the example of a positional encoder, the angular velocity of the motor can be calculated by dividing the obtained angular position by an associated time interval. An instantaneous angular velocity may be calculated, or alternatively, the angular velocity may be time-averaged over multiple data points, or otherwise filtered.

Next, at 430, the terminal voltage applied to the motor's brushes is determined as described above. The terminal voltage may aid in estimating the motor's magnetic field, as the terminal voltage can be approximated as being proportional to the time derivative of $\phi$, the magnetic flux of the motor's magnets and to the motor angular velocity. Further, the motor magnetic field can be approximated by multiplying $\phi$ by the area of the motor poles.

Next, at 440, a lookup table is generated with the motor angular velocity and terminal voltage supplied as inputs.

Next, at 450, the lookup table generated in 440 outputs and estimates the temperature of the motor's magnets, the motor angular velocity, and the motor magnetic field.

Finally, at 460, the actual motor torque may be estimated for a given current at the present motor operating temperature. The motor torque may then be supplied to the motor position controller to improve accurate control of motor position, and thus wastegate position control.

Figure 5:
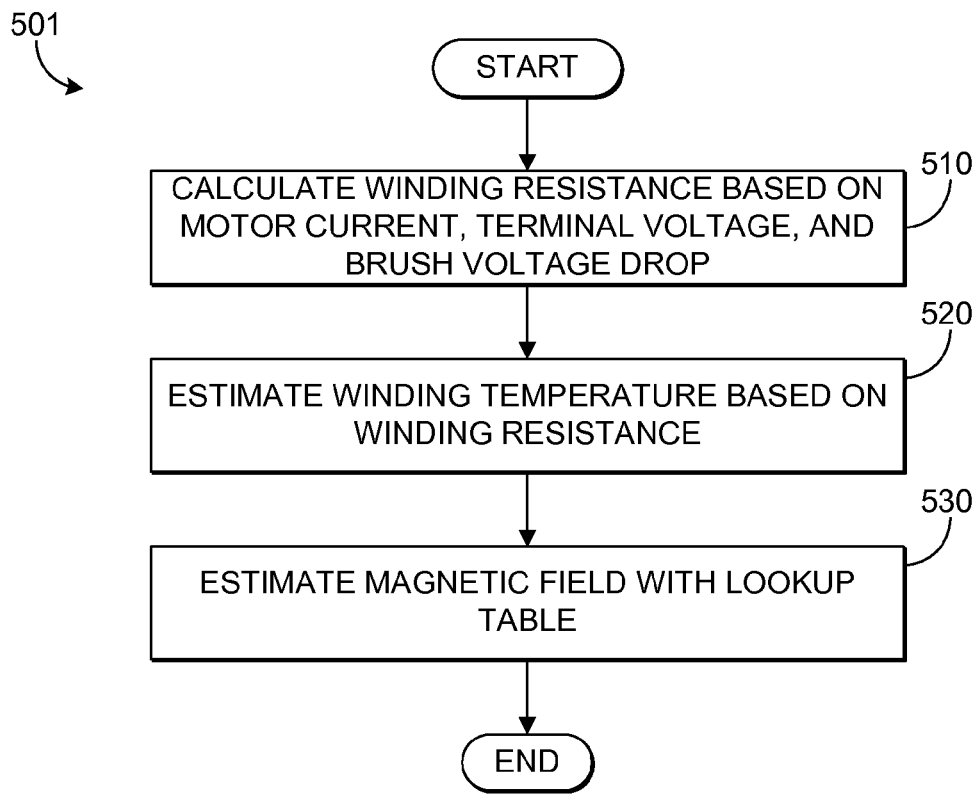
FIG. 5 shows a flow chart illustrating an alternative method for estimating and correcting for a varying magnetic field produced by an electric actuator.

FIG. 5 shows an alternative method 501 for carrying out step 350 of method 301. Specifically, method 501 measures a temperature in proximity to the motor's magnets and uses this measurement to estimate the magnetic field produced by the motor.

At 510 of method 501, the winding resistance of the motor is calculated based on the following relation: $V=i^2R+K(d\phi/dt)+V_{brush}$, where V is the terminal voltage, i is the motor current, R is the winding resistance, K is a constant, $\phi$ is the magnet flux, t is time, and $V_{brush}$ is the voltage drop across the brush. In some embodiments, $V_{brush}$ may be 0.7V per brush, though this information may be obtained from prior testing of the motor or motor specifications. In the case where the motor is not in motion, the flux term may be omitted and the relation reduces to $V=i^2R+V_{brush}$. Having determined the above quantities, R is obtained and the winding resistance is estimated.

At 520, the magnet temperature is estimated assuming the resistance of the windings varies as a function of temperature. As an example, the resistance of copper changes 0.4% per degree Celsius, though the relation $R=R_i(1+\alpha(\Delta T)$ may be used to determine how winding resistance changes with temperature, where R is winding resistance, $R_i$ winding resistance at an initial temperature, a an expansion coefficient specific to the winding material, and $\Delta T$ a change in temperature. With a determined percent change in resistance per degree, and the calculated winding resistance, the winding temperature is estimated. Because the motor windings are in close proximity to the motor magnets, the magnet temperature may be estimated with the wire temperature, in one example.

At 530, a lookup table is generated and used to estimate the motor magnetic field.

In this way, undesirable turbocharger and engine operation due to degraded wastegate control resulting from variation in a wastegate actuator's magnetic field as a function of temperature may be reduced and/or eliminated. As surrounding temperatures increase, or at a relatively high first temperature, the magnetic field may be inhibited and its magnitude reduced. Accordingly, the torque achieved by the motor for a given current also decreases. Such loss of torque may be compensated by increasing the voltage, signal amplitude, and/or duty cycle employed to actuate the motor, as a greater amount of torque is required to sufficiently actuate a wastegate valve. Conversely, as surrounding temperatures decrease, or at a second temperature lower than the first temperature, the magnitude of the magnetic field may be greater. The torque achieved by the motor for a given current may thus increase. Accordingly, the voltage, signal amplitude, and/or duty cycle employed to actuate the motor may be reduced, as a lower amount of torque is required to sufficiently actuate the wastegate valve.

Note that the example control and estimation methods included herein can be used with various engine and/or vehicle system configurations. The specific methods described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a wastegate actuator coupled to a wastegate valve in an engine exhaust to control an engine boost level of an engine, the adjustment based on a magnetic field of a magnet in the wastegate actuator corrected based on a magnet temperature; wherein
the adjustment includes adjusting a current supplied to the actuator, and wherein the adjustment is further based on an actuator winding resistance, the resistance based on the magnet temperature.

2. The method of claim 1 wherein the magnet temperature is estimated based on an engine exhaust temperature and one or more operating conditions of the engine.

3. The method of claim 2 wherein the adjustment further includes, for a first material, reducing the current for a given actuator torque when the magnet temperature is above a threshold, and increasing the current for the given torque when the magnet temperature is below a threshold, and for a second material, increasing the current for a given actuator torque when the magnet temperature is above a threshold, and decreasing the current for the given torque when the magnet temperature is below a threshold.

4. The method of claim 3, wherein the magnetic field is estimated based on a lookup table having inputs including an actuator position, an actuator angular velocity, and an actuator terminal voltage.

5. The method of claim 3, wherein the magnetic field is estimated based on a lookup table, the lookup table generated based on one or more of an actuator current, an actuator terminal voltage, an actuator brush voltage, an estimated actuator wire resistance, an actuator resistance change, and an estimated actuator wire temperature.

6. A method of controlling a turbocharger of an engine via an electric actuator, comprising:
estimating a magnet temperature of one or more magnets disposed in the electric actuator;
estimating a magnetic field of the one or more magnets based on the estimated magnet temperature;
determining a magnetic field correction based on the estimated magnetic field;
operating the electric actuator with a current determined based on the magnetic field correction; and
adjusting the magnetic field correction based on a change in the estimated magnet temperature; wherein
the magnet temperature is estimated based on an engine exhaust temperature and one or more operating conditions of the engine.

7. The method of claim 6 wherein the actuator includes permanent magnets, and
wherein the magnetic field is estimated based on a lookup table having inputs including an actuator position, an actuator angular velocity, and an actuator terminal voltage.

8. The method of claim 7 wherein the actuator is coupled to a wastegate of the turbocharger, and
wherein the magnetic field correction is further based on an actuator winding resistance.

9. The method of claim 8 wherein a position of the wastegate is controlled to a desired position based on the magnetic field correction, and
wherein the actuator winding resistance is based on the magnet temperature.

10. The method of claim 9 wherein the desired position is based on a desired engine boost level.

11. The method of claim 10 further comprising direct injecting fuel to a cylinder of the engine.

12. A method of controlling an engine turbocharger wastegate via an electric actuator, comprising:
at a first temperature of the electric actuator,
adjusting the electric actuator based on an increased actuator magnetic field voltage correction; and
at a second, lower temperature of the electric actuator,
adjusting the electric actuator based on a reduced actuator magnetic field voltage correction; wherein
the electric actuator includes magnets,
the electric actuator is adjusted by adjusting a duty cycle delivered to the electric actuator from a controller, the controller including instructions for carrying out the adjusting actions, and
the duty cycle is increased at the first temperature and decreased at the second temperature.

13. The method of claim 12 wherein the wastegate is adjusted to maintain a desired boost level in an intake of the engine.

* * * * *